United States Patent
Duboust et al.

(10) Patent No.: US 6,837,983 B2
(45) Date of Patent: Jan. 4, 2005

(54) ENDPOINT DETECTION FOR ELECTRO CHEMICAL MECHANICAL POLISHING AND ELECTROPOLISHING PROCESSES

(75) Inventors: Alain Duboust, Sunnyvale, CA (US); Yan Wang, Sunnyvale, CA (US); Siew Neo, Santa Clara, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 189 days.

(21) Appl. No.: 10/056,316

(22) Filed: Jan. 22, 2002

(65) Prior Publication Data

US 2003/0136684 A1 Jul. 24, 2003

(51) Int. Cl.[7] .............................. C25F 3/00; C22D 17/00
(52) U.S. Cl. ................................... 205/645; 204/224 M
(58) Field of Search ...................... 204/224 M; 205/645

(56) References Cited

U.S. PATENT DOCUMENTS

| | | | | |
|---|---|---|---|---|
| 3,162,588 A | 12/1964 | Bell | .......................... | 205/662 |
| 3,448,023 A | 6/1969 | Bell | .......................... | 204/209 |
| 3,873,512 A | 3/1975 | Latanision | ............ | 204/129.46 |
| 4,125,444 A | 11/1978 | Inoue | .................... | 204/129.43 |
| 4,713,149 A | 12/1987 | Hoshino | ...................... | 204/23 |
| 4,793,895 A | 12/1988 | Kaanta et al. | .............. | 156/627 |

(List continued on next page.)

FOREIGN PATENT DOCUMENTS

| | | | |
|---|---|---|---|
| EP | 0 325 753 | | 8/1989 |
| EP | 0 455 455 | | 6/1991 |
| EP | 1103346 | * | 5/2001 |
| JP | 10-16213 | | 1/1998 |
| JP | 2870537 | | 1/1999 |
| JP | 11-042554 | | 2/1999 |
| JP | 2000-218513 | | 8/2000 |
| JP | 2001-77117 | | 3/2001 |
| JP | P2001-77117 A | | 3/2001 |
| JP | 2001-244223 | | 9/2001 |
| WO | 98/49723 | | 11/1998 |
| WO | WO-1998-49723 | | 11/1998 |
| WO | WO-1999-41434 | | 8/1999 |
| WO | WO 99/53119 | | 10/1999 |
| WO | WO-1999-53119 | | 10/1999 |
| WO | WO-2000-03426 | | 1/2000 |
| WO | WO-2000-26443 | | 5/2000 |

(List continued on next page.)

OTHER PUBLICATIONS

PCT Written Opinion for PCT/US03/01760 dated Mar. 8, 2004 (AMAT/6339.PC).
Alexander, et al., "Electrically Conductive Polymer Nano-composite Materials," www.afrlhorizons.com/Briefs/Sept02/ML0206.html, Date Unknown.
PCT International Search Report for PCT/US03/29230 dated Feb. 3, 2004 (AMAT/6874.PC).
Nogami "An Innovation to Integrate Porous Low–K Materials and Copper", InterConnect Japan 2001; Honeywell Seminar (Dec. 6, 2001); pp. 1–12.
Contolini et al. "Electrochemical Planarization of ULSI Copper," Solid State Technology; vol. 40, No. 6, Jun. 1, 1997, pp. 155–156, 158, 160, 162.
PCT Search Report dated May 27, 2003.

Primary Examiner—Patrick Ryan
Assistant Examiner—Thomas H. Parsons
(74) Attorney, Agent, or Firm—Moser, Patterson & Sheridan

(57) ABSTRACT

Systems and methods for detecting the endpoint of a polishing step. In general, an electropolishing system is provided with a power supply configured to deliver a current through an electrolytic solution. Signal characteristics of the signal provided by the power supply are monitored to determine a polishing endpoint. Illustratively, the monitored signal characteristics include current and voltage.

39 Claims, 5 Drawing Sheets

U.S. PATENT DOCUMENTS

| | | | |
|---|---|---|---|
| 4,839,993 A | 6/1989 | Masuko et al. | 51/129 |
| 4,934,102 A | 6/1990 | Leach et al. | 51/50 R |
| 4,954,141 A | 9/1990 | Takiyama et al. | 51/296 |
| 4,956,056 A | 9/1990 | Zubatova et al. | 204/129.43 |
| 5,096,550 A | 3/1992 | Mayer | 204/129.1 |
| 5,136,817 A | 8/1992 | Tabata et al. | 51/165.71 |
| 5,217,586 A | 6/1993 | Datta et al. | 204/129.6 |
| 5,225,034 A | 7/1993 | Yu et al. | 156/636 |
| 5,534,106 A | 7/1996 | Cote et al. | 156/636.1 |
| 5,543,032 A | 8/1996 | Datta et al. | 205/670 |
| 5,567,300 A | 10/1996 | Datta et al. | 205/652 |
| 5,575,706 A | 11/1996 | Tsai et al. | 451/41 |
| 5,578,362 A | 11/1996 | Reinhardt et al. | 428/147 |
| 5,624,300 A | 4/1997 | Kishii et al. | 451/36 |
| 5,738,574 A | 4/1998 | Tolles et al. | 451/288 |
| 5,804,507 A | 9/1998 | Perlov et al. | 438/692 |
| 5,807,165 A | 9/1998 | Uzoh et al. | 451/41 |
| 5,846,882 A | 12/1998 | Birang | 438/692 |
| 5,871,392 A | 2/1999 | Meikle et al. | 451/56 |
| 5,893,796 A | 4/1999 | Birang et al. | 451/526 |
| 5,911,619 A | 6/1999 | Uzoh et al. | 451/5 |
| 5,931,719 A | 8/1999 | Nagahara et al. | 451/41 |
| 5,938,801 A | 8/1999 | Robinson | 51/306 |
| 6,001,008 A | 12/1999 | Fujimori et al. | 451/443 |
| 6,004,880 A | 12/1999 | Liu et al. | 438/692 |
| 6,010,395 A | 1/2000 | Nakajima | 451/287 |
| 6,017,265 A | 1/2000 | Cook et al. | 451/41 |
| 6,020,264 A | 2/2000 | Lustig et al. | 438/692 |
| 6,024,630 A | 2/2000 | Shendon et al. | 451/41 |
| 6,066,030 A | 5/2000 | Uzoh | 451/41 |
| 6,090,239 A | 7/2000 | Liu et al. | 156/345 |
| 6,103,096 A | 8/2000 | Datta et al. | 205/686 |
| 6,116,998 A | 9/2000 | Damgaard et al. | 451/490 |
| 6,153,043 A | 11/2000 | Edelstein et al. | 156/345 |
| 6,156,124 A | 12/2000 | Tobin | 118/719 |
| 6,159,079 A | 12/2000 | Zuniga et al. | 451/41 |
| 6,171,467 B1 | 1/2001 | Weihs et al. | 205/93 |
| 6,176,992 B1 | 1/2001 | Talieh | 205/87 |
| 6,210,257 B1 | 4/2001 | Carlson | 451/56 |
| 6,234,870 B1 | 5/2001 | Uzoh et al. | 451/8 |
| 6,238,271 B1 | 5/2001 | Cesna | 451/41 |
| 6,244,935 B1 | 6/2001 | Birang et al. | 451/41 |
| 6,248,222 B1 | 6/2001 | Wang | 204/297.09 |
| 6,273,798 B1 | 8/2001 | Berman | 451/72 |
| 6,297,159 B1 | 10/2001 | Paton | 438/693 |
| 6,328,872 B1 | 12/2001 | Talieh et al. | 205/206 |
| 6,368,184 B1 | 4/2002 | Beckage | 451/9 |
| 6,368,190 B1 * | 4/2002 | Easter et al. | 451/41 |
| 6,381,169 B1 | 4/2002 | Bocian et al. | 365/151 |
| 6,386,956 B1 | 5/2002 | Sato et al. | 451/57 |
| 6,391,166 B1 | 5/2002 | Wang | 204/224 R |
| 6,395,152 B1 | 5/2002 | Wang | 204/224 M |
| 6,402,591 B1 | 6/2002 | Thornton | 451/36 |
| 6,406,363 B1 | 6/2002 | Xu et al. | 451/296 |
| 6,409,904 B1 | 6/2002 | Uzoh et al. | 205/137 |
| 6,413,388 B1 | 7/2002 | Uzoh et al. | 204/224 R |
| 6,413,403 B1 | 7/2002 | Lindquist et al. | 205/97 |
| 6,440,295 B1 | 8/2002 | Wang | 205/640 |
| 6,447,668 B1 | 9/2002 | Wang | 205/645 |
| 6,471,847 B2 | 10/2002 | Talieh et al. | 205/147 |
| 6,482,307 B2 | 11/2002 | Ashjaee et al. | 205/103 |
| 6,497,800 B1 | 12/2002 | Talieh et al. | 204/224 R |
| 6,630,059 B1 | 10/2003 | Uzoh et al. | 204/212 |
| 6,638,863 B2 | 10/2003 | Wang et al. | 438/690 |
| 6,726,823 B1 | 4/2004 | Wang et al. | 205/80 |
| 2001/0005667 A1 | 6/2001 | Tolles et al. | |
| 2001/0024878 A1 | 9/2001 | Nakamura | |
| 2001/0027018 A1 | 10/2001 | Molnar | 438/690 |
| 2001/0035354 A1 | 11/2001 | Ashjaee et al. | |
| 2001/0036746 A1 | 11/2001 | Sato et al. | |
| 2001/0040100 A1 | 11/2001 | Wang | |
| 2001/0042690 A1 | 11/2001 | Talieh | 205/118 |
| 2002/0008036 A1 | 1/2002 | Wang | |
| 2002/0011417 A1 | 1/2002 | Talieh et al. | |
| 2002/0020621 A1 | 2/2002 | Uzoh et al. | |
| 2002/0025760 A1 | 2/2002 | Lee et al. | |
| 2002/0025763 A1 | 2/2002 | Lee et al. | 451/41 |
| 2002/0070126 A1 | 6/2002 | Sato | |
| 2002/0077037 A1 | 6/2002 | Tietz | |
| 2002/0088715 A1 | 7/2002 | Talieh et al. | |
| 2002/0108861 A1 | 8/2002 | Emesh et al. | 205/81 |
| 2002/0119286 A1 | 8/2002 | Chen et al. | |
| 2002/0130049 A1 | 9/2002 | Chen et al. | |
| 2003/0016446 A1 | 1/2003 | Duboust et al. | |
| 2003/0114087 A1 | 6/2003 | Duboust et al. | |
| 2003/0116445 A1 | 6/2003 | Sun et al. | |
| 2003/0116446 A1 | 6/2003 | Duboust et al. | |
| 2003/0213703 A1 | 11/2003 | Wang et al. | |

FOREIGN PATENT DOCUMENTS

| | | |
|---|---|---|
| WO | WO-2000-33356 | 6/2000 |
| WO | WO-2000-59682 | 10/2000 |
| WO | WO-2001-13416 | 2/2001 |
| WO | WO-2001-49452 | 7/2001 |
| WO | WO-2001-52307 | 7/2001 |
| WO | WO-2001-63018 | 8/2001 |
| WO | WO-2001-71066 | 9/2001 |
| WO | WO-2001-88229 | 11/2001 |
| WO | WO-2001-88954 | 11/2001 |
| WO | WO 02/23616 | 3/2002 |
| WO | WO-2002-23616 | 3/2002 |
| WO | 02/064314 | 8/2002 |
| WO | WO-2002-64314 | 8/2002 |
| WO | 03/001581 | 1/2003 |
| WO | WO-2003-001581 | 1/2003 |

* cited by examiner

ENDPOINT DETECTION FOR ELECTRO CHEMICAL MECHANICAL POLISHING AND ELECTROPOLISHING PROCESSES

BACKGROUND OF THE INVENTION

1. Field of the Invention

The present invention generally relates to polishing, planarization, plating and combinations thereof. More particularly, the invention relates to endpoint detection of a polishing process and to the monitoring and control of electro chemical mechanical polishing and electropolishing.

2. Description of the Related Art

Sub-quarter micron multi-level metallization is one of the key technologies for the next generation of ultra large-scale integration (ULSI). The multilevel interconnects that lie at the heart of this technology require planarization of interconnect features formed in high aspect ratio apertures, including contacts, vias, trenches and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the substrate may become non-planar across its surface and require planarization. An example of a non-planar process is the deposition of copper films with an ECP process in which the copper topography simply follows the already existing non-planar topography of the wafer surface, especially for lines wider than 10 microns. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical Mechanical Planarization, or Chemical Mechanical Polishing (CMP), is a common technique used to planarize substrates. CMP utilizes a chemical composition, typically a slurry or other fluid medium, for selective removal of materials from substrates. In conventional CMP techniques, a substrate carrier or polishing head is mounted on a carrier assembly and positioned in contact with a polishing pad in a CMP apparatus. The carrier assembly provides a controllable pressure to the substrate, thereby pressing the substrate against the polishing pad. The pad is moved relative to the substrate by an external driving force. The CMP apparatus affects polishing or rubbing movements between the surface of the substrate and the polishing pad while dispersing a polishing composition to affect chemical activitities and/or mechanical activities and consequential removal of materials from the surface of the substrate.

Another planarization technique is Electro Chemical Mechanical Polishing (ECMP). ECMP techniques remove conductive materials from a substrate surface by electrochemical dissolution while concurrently polishing the substrate with reduced mechanical abrasion compared to conventional CMP processes. The electrochemical dissolution is performed by applying a bias between a cathode and a substrate surface to remove conductive materials from the substrate surface into a surrounding electrolyte. Typically, the bias is applied by a ring of conductive contacts to the substrate surface in a substrate support device, such as a substrate carrier head. Mechanical abrasion is performed by positioning the substrate in contact with conventional polishing pads and providing relative motion there between.

An objective of polishing is to remove a predictable amount of material. Accordingly, any polishing technique requires an endpoint detection to determine when the appropriate amount of material has been removed. However, the progress of the polishing operation is not easily viewable because of the contact between the substrate and the pad.

In addition, variations in the polishing conditions impede an accurate determination of the polishing endpoint. Variations in the slurry composition, pad condition, relative speed between the pad and the substrate, and the load of the substrate on the pad, etc . . . cause variations in the material removal rate, which change the time needed to reach the polishing endpoint. Therefore, the polishing endpoint cannot be estimated merely as a function of polishing time.

One approach to predict the polishing endpoint is to remove the substrate from the polishing surface and measure the thickness of the remaining film on the substrate. Doing so periodically during polishing, the quantity of material being removed from the substrate may be determined. As such, a linear approximation of the material removal rate may be used to determine the polishing endpoint. However, this method is time consuming, and does not account for sudden changes in the removal rate that may occur between measurement intervals.

Several non-invasive methods of endpoint detection are known. One type of endpoint detection typically requires access to at least a portion of the substrate surface being polished, such as by sliding a portion of the substrate over the edge of the polishing pad or through a window in the pad, and simultaneously analyzing the exposed portion of the substrate. For example, where polishing is used to expose metal lines embedded in a dielectric layer, the overall or composite reflectivity of the surface being polished changes as the lines are exposed. By monitoring the reflectivity of the polished surface or the wavelength of light reflected from the surface, the exposure of the lines through the dielectric layer, and thus the polishing endpoint, can be detected. However, this method does not provide a way of determining the polishing endpoint unless an underlying layer is exposed during polishing. Additionally, this approach is somewhat erratic in predicting the polishing endpoint unless all of the underlying lines are simultaneously exposed. Furthermore, the detection apparatus is delicate and subject to frequent breakdown caused by the exposure of the measuring or detecting apparatus to the slurry or electrolytic fluid.

A second type of method for determining the polishing endpoint monitors various process parameters, and indicates an endpoint when one or more of the parameters abruptly change. For example, the coefficient of friction at the interface of the polishing pad and the substrate is a function of the surface condition of the substrate. Where an underlying material different from the film being polished is exposed, the coefficient of friction will change also. This affects the torque necessary to provide the desired polishing pad speed. By monitoring this change, the endpoint may be detected.

In an ideal system, where no parameter other than the substrate surface changes, process parameter endpoint detection is acceptable. However, as the substrate is being polished, the pad condition and the slurry/electrolyte composition at the pad-substrate interface also change. Such changes may mask the exposure of the underlying metal layer, or they may imitate an endpoint condition, leading to a premature stop of polishing.

Finally, ECMP presents a chemically, electrically and physically unique environment, with respect to conventional CMP. Thus, while the endpoint detection techniques (including those described above) exist for CMP, the techniques may not be readily extendible to ECMP. Even where the techniques are extendible to ECMP, doing so may require retrofitting existing processing systems with expensive equipment. A preferred approach would mitigate or avoid the challenges with retrofitting existing systems.

Therefore, there is a need for polishing endpoint detection which accurately and reliably determines when to cease polishing, particularly for ECMP.

SUMMARY OF THE INVENTION

One embodiment provides a method for detecting a polishing endpoint in an electropolishing environment. The method comprises providing a cell body defining an electrolyte-containing volume, wherein the electrolyte-containing volume contains at least electrolyte. A substrate is positioned in contact with a polishing pad at least partially submersed in the electrolyte and one or more conductive materials on the substrate are electropolished. The polishing endpoint of the electropolishing is then detected.

In another embodiment the foregoing method further comprises establishing a potential difference between a first electrode and a second electrode disposed in the electrolyte in order to produce a current through the electrolyte, wherein at least the first electrode is not disposed on a polishing surface of the polishing pad. The polishing endpoint of the electropolishing is then detected according to at least one of the potential difference and the current.

Another embodiment provides for an electro-chemical mechanical polishing system configured with an endpoint detection system. The system comprises a cell body defining an electrolyte-containing volume and a polishing pad disposed in the electrolyte-containing volume. A power supply is configured to supply an electrical signal to electrolyte contained in the electrolyte-containing volume. The endpoint detection system is configured to monitor a signal characteristic of the electrical signal to detect a polishing endpoint.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings It is to be noted, however, that the appended drawings illustrate only typical embodiments of this invention and are therefore not to be considered limiting of its scope, for the invention may admit to other equally effective embodiments

DETAILED DESCRIPTION OF THE PREFERRED EMBODIMENT

The present invention provides systems and methods for detecting the endpoint of a polishing step. In general, an electropolishing system is provided with a power supply configured to deliver a voltage through an electrolytic solution. Signal characteristics of the signal provided by the power supply are monitored to determine a polishing endpoint. Illustratively, the monitored signal characteristics include current and voltage.

The words and phrases used herein should be given their ordinary and customary meaning in the art by one skilled in the art unless otherwise further defined. Chemical-mechanical polishing should be broadly construed and includes, but is not limited to, abrading a substrate surface by chemical activities, mechanical activities, or a combination of both chemical and mechanical activities. Electropolishing should be broadly construed and includes, but is not limited to, planarizing a substrate by the application of electrical and/or electrochemical activity. Electrochemical mechanical polishing (ECMP) should be broadly construed and includes, but is not limited to, planarizing a substrate by the application of electrochemical activity, mechanical activity, or a combination of both electrochemical and mechanical activity to remove materials from a substrate surface. Electrochemical mechanical plating process (ECMPP) should be broadly construed and includes, but is not limited to, electrochemically depositing material on a substrate and concurrently planarizing the deposited material by the application of electrochemical activity, mechanical activity, or a combination of both electrochemical and mechanical activity.

Anodic dissolution should be broadly construed and includes, but is not limited to, the application of an anodic bias to a substrate directly or indirectly which results in the removal of conductive material from a substrate surface and into a surrounding electrolyte solution. Perforation should be broadly construed and includes, but is not limited to, an aperture, hole, opening, channel, or passage formed partially or completely through an object.

Embodiments of the invention broadly provide for endpoint detection in a polishing system. In general, any of the above defined polishing techniques may be used, individually or in combination. Further, it is contemplated that polishing and plating may occur simultaneously or alternately. The foregoing embodiments are broadly characterized as electropolishing.

Figure 1:
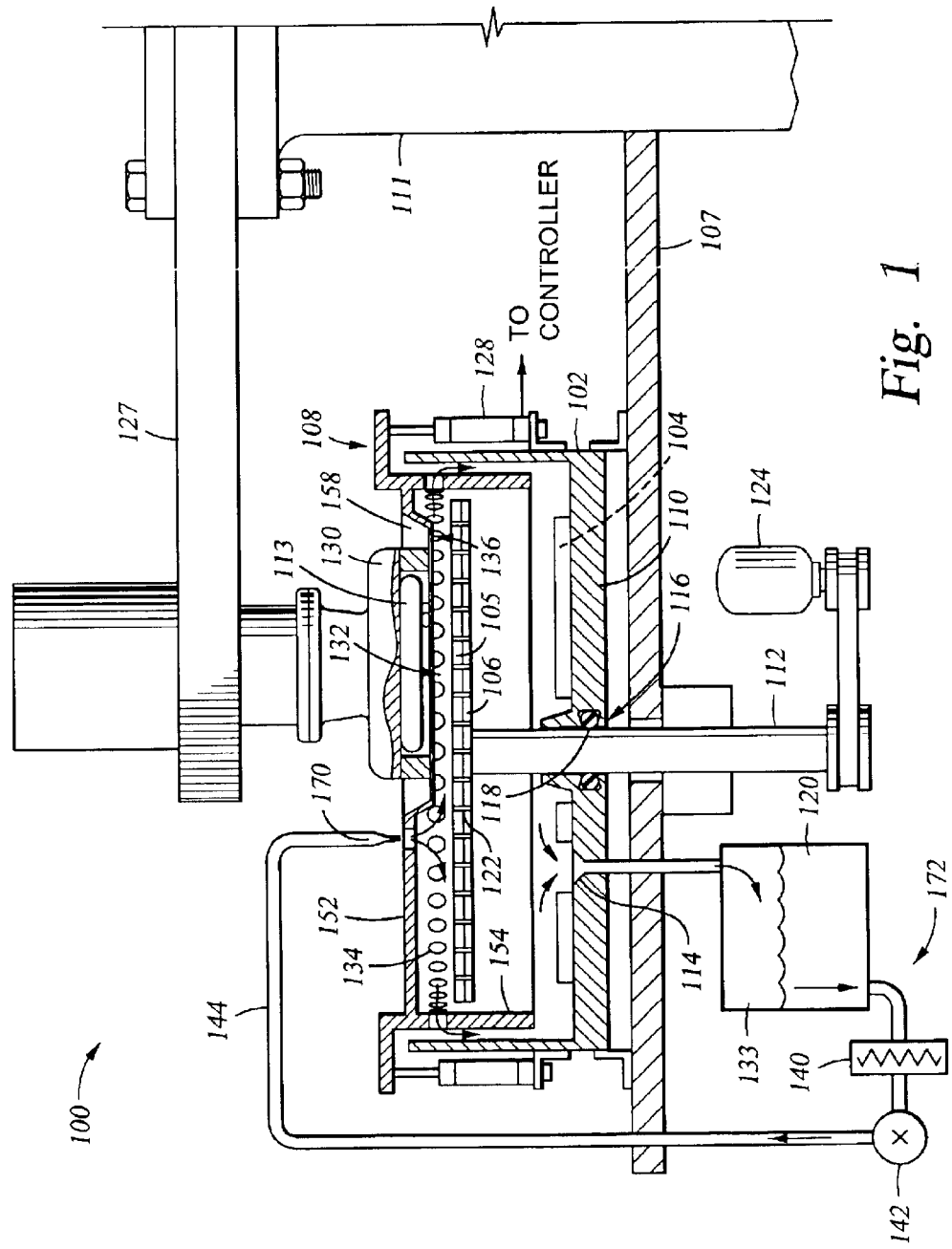
FIG. 1 is a side cross-sectional view of the electropolishing system.

FIG. 1 depicts an electrochemical mechanical polishing (ECMP) station 100, which may be a component of a larger platform or tool. One polishing tool that may be adapted to benefit from the invention is a MIRRA® chemical mechanical polisher available from Applied Materials, Inc. located in Santa Clara, Calif.

Generally, the electrochemical mechanical polishing (ECMP) station 100 comprises a polishing head 130 adapted to retain the substrate 113. Illustratively, the polishing head 130 is a cantilever mounted to a carousel 111 by a brace 127. The carousel 111 operates to rotate the polishing head 130 to a position over various stations, including the ECMP station 100. Examples of embodiments of polishing heads 130 that may be used with the polishing apparatus 100 described herein are described in U.S. Pat. No. 6,024,630, issued Feb. 25, 2000 to Shendon, et al. One particular polishing head that may be adapted to be used is a TITAN HEAD™ wafer carrier, manufactured by Applied Materials, Inc., located in Santa Clara, Calif.

The ECMP station 100 further includes a basin 102, an electrode 104, polishing medium 105, a pad support disc 106 and a cover 108. In one embodiment, the basin 102 is coupled to a base 107 of the polishing apparatus 100. The basin 102, the cover 108, and the disc 106 may be movably disposed relative to the base 107 by a pneumatic cylinder 128. Accordingly, the basin 102, cover 108 and disc 106 may be axially moved toward the base 107 to facilitate clearance of the polishing head 130 as the carousel 111 indexes the substrate 113 between the ECMP 100 and other polishing stations (not shown).

The basin 102 generally defines a container or electrolyte-containing volume 132 in which a conductive fluid such as an electrolyte 120 (shown in a reservoir 133) can be confined and in which the electrode 104, polishing medium 105, and disc 106 are generally housed. The electrolyte 120 used in processing the substrate 113 can electrochemically remove metals such as copper, aluminum, tungsten, gold, silver or other conductive materials. Accordingly, the basin 102 can be a bowl-shaped member made of a plastic such as fluoropolymers, TEFLON®, PFA, PE, PES, or other materials that are compatible with electroplating and electropolishing chemistries.

The basin 102 has a bottom 110 that includes an aperture 116 and a drain 114. The aperture 116 is generally disposed in the center of the bottom 110 and allows a shaft 112 to pass therethrough. A seal 118 is disposed between the aperture 116 and the shaft 112 and allows the shaft 112 to rotate while preventing fluids disposed in the basin 102 from passing through the aperture 116. Rotation is imparted to the shaft 112 by a motor connected to a lower end of the shaft 112. The motor may be an actuator capable of rotating the shaft at a predefined speed or speeds.

At an upper end, the shaft carries the disc or pad support 106. The pad support disc 106 provides a mounting surface for the polishing medium 105, which may be secured to the disc 106 by a clamping mechanism or an adhesive (such as a pressure sensitive adhesive). Although shown connected to the shaft 112, in another embodiment, the disc 106 can be secured in the basin 102 using fasteners such as screws or other fastening means, thereby eliminating the need for the shaft 112. The disc 106 can be spaced from the electrode 104 to provide a better electrolyte recirculation.

In one embodiment, the disc 106 may be made from a material compatible with the electrolyte 120 which would not detrimentally affect polishing. Illustratively, the disc 106 may be fabricated from a polymer, for example fluoropolymers, PE, TEFLON®, PFA, PES, HDPE, UHMW or the like. In one embodiment, the disc 106 includes a plurality of perforations or channels formed therein. The perforations are coupled to the perforations of the polishing medium 105 which, cooperatively, define channels 122 extending from a lower surface of the disc 106 to an upper surface of the polishing medium 105. The provision of the channels 122 make the disc 106 and the polishing medium 105 generally permeable to the electrolyte 120. The perforation size and density is selected to provide uniform distribution of the electrolyte 120 through the disc 106 to the substrate 113.

The polishing medium 105 can be a pad, a web or a belt of material, which is compatible with the fluid environment and the processing specifications. The polishing medium 105 is positioned at an upper end of the basin 102 and supported on its lower surface by the disc 106. In one embodiment, the polishing medium 105 includes at least a partially conductive surface of a conductive material for contact with the substrate surface during processing. Accordingly, the polishing medium 105 may be a conductive polishing material or a composite of a conductive polishing material disposed in a conventional polishing material. The conductive material may also be inserted between the disc 106 and polishing material 105 with some conductive ends for contact with the substrate during polishing. The conductive polishing materials and the conventional polishing materials generally have mechanical properties which do not degrade under sustained electric fields and are resistant to degradation in acidic or basic electrolytes.

The conductive polishing material may include conductive polymers, polymer composites with conductive materials, conductive metals, conductive fillers or conductive doping materials, or combinations thereof. Conductive polymers include polymeric materials that are intrinsically conductive, such as polyacetylene, polyethylenedioxythiophene (PEDT), which is commercially available under the trade name Baytron™, polyaniline, polypyrrole, and combinations thereof.

The polymer composites with conductive materials may include polymer-noble metal hybrid materials. Polymer-noble metal hybrid materials that may be used as the conductive polishing material described herein are generally chemically inert with a surrounding electrolyte, such as those with noble metals that are resistant to oxidation. An example of a polymer-noble metal hybrid material is a platinum-polymer hybrid material. The invention contemplates the use of polymer-noble metal hybrid materials, which are chemically reactive with a surrounding electrolyte, when the polymer-noble metal hybrid material is insulated from a surrounding electrolyte by another material.

Conductive metals that may be used as the polishing material are those metals that are relatively inert to chemical reactions with the surrounding electrolyte. Platinum is an example of a conductive metal that may be used as the polishing material. The conductive metals may form a portion or the entire polishing surface of the polishing material. When forming a portion of the polishing surface, the conductive metals are typically disposed in a conventional polishing material.

The conductive polishing materials may further include conductive fillers or conductive doping materials disposed in a binder material, such as the conductive polymers described above or a conventional polishing material. Examples of conductive fillers include carbon powder, carbon fibers, carbon nanotubes, carbon nanofoam, carbon aerogels, and combinations thereof. Carbon nanotubes are conductive hollow filaments of carbon material having a diameter in the nanometer size range. The conductive fillers or conductive doping materials are disposed in the binding material in an amount sufficient to provide a polishing medium having a desired conductivity. The binder material is typically a conventional polishing material.

Conventional polishing materials may include polymeric materials, such as polyurethane, polycarbonate, polyphenylene sulfide (PPS), or combinations thereof, and other polishing materials used in polishing substrate surfaces. An exemplary conventional material includes those found in the IC series of polishing media, for example polyurethane and polyurethane mixed with fillers, commercially available from Rodel Inc., of Phoenix, Ariz. The invention further contemplates the use of other conventional polishing materials, such as a layer of compressible material. The compressible material includes a conventional soft material, such as compressed felt fibers leached with urethane.

Generally, the conductive polishing material or the composite of the conductive polishing material and conventional polishing material are provided to produce a conductive polishing medium having a bulk resistivity of about 10 Ωcm or less or a surface resistivity of about 10 Ω/Square or less. In one aspect, the polishing medium has a resistivity of about 1 Ωcm or less. An example of the conductive polishing material is a layer of platinum, which has a resistivity 9.81 $\mu$Ωcm at 0° C., disposed on a layer of polyurethane.

The composite of the conductive polishing material and conventional polishing material may include between about 5 wt. % and about 60 wt. % of conductive polishing material in the polishing medium 105. An example of a composite of the conductive polishing material and conventional polishing material includes carbon fibers or carbon nanotubes, disposed in a conventional polishing material of polycarbonate or polyurethane in sufficient amounts to provide a polishing medium having a bulk resistivity of about 10 Ωcm or less and a surface resistivity of about 10 Ω/Square or less.

Further, the invention contemplates the use of abrasive materials embedded in the conventional polishing material. In such an embodiment, the fixed abrasive particles generally include conductive abrasive materials.

Alternatively, the polishing medium 105 may comprise a metal mesh disposed in the conventional polishing material. The metal mesh may comprise a chemically inert conductive material, such as platinum. The metal mesh may also include materials that have been observed to react with the surrounding electrolyte, such as copper, if the metal mesh is chemically insulated from the electrolyte such as by a conformal layer of conventional material.

Figure 2:
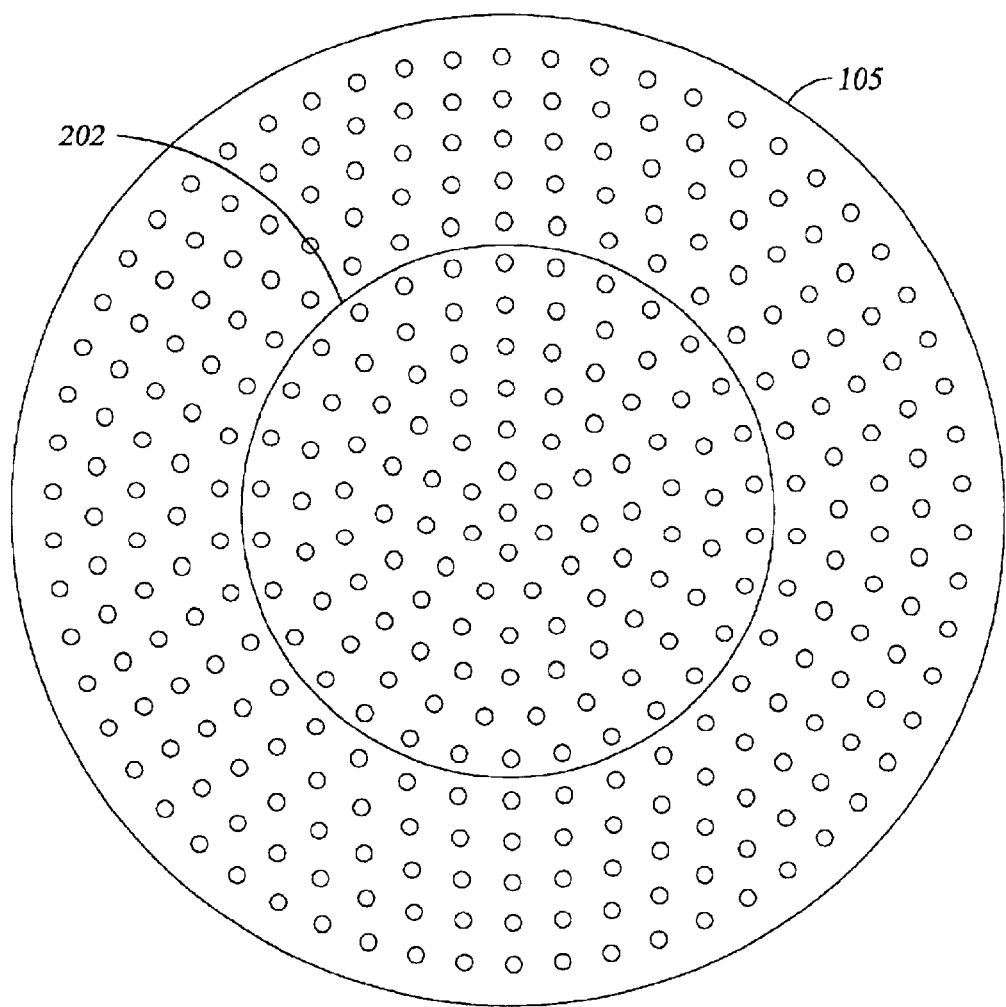
FIG. 2 is an of a top view of an exemplary polishing pad.

Referring briefly to FIG. 2, a particular illustrative embodiment of the polishing medium 105 is shown from a top view. Generally, the polishing medium 105 is a perforated disc-shaped pad having a conducting element 202 disposed on an upper polishing surface. Illustratively, the conducting element 202 is an annular member disposed about a central axis of the polishing medium 105. More generally, however, the conducting element 202 may be any shape. Further, the conducting element 202 need not be a singular member, but may be a plurality of integrated conducting members, as in the case of the metal mesh described above. The location and size of the conducting element 202 is selected to insure contact between the element 202 and a substrate (e.g., substrate 113) regardless of the position of the substrate on the polishing medium 105.

Because the polishing medium 105 is at least partially conductive, the polishing medium 105 may act as an electrode in combination with the substrate during electrochemical processes. Referring to FIG. 1, the electrode 104 is a counter-electrode to the polishing medium 105 contacting a substrate surface. The electrode 104 may be an anode or cathode depending upon the positive bias (anode) or negative bias (cathode) applied between the electrode 104 and polishing medium 105.

For example, depositing material from an electrolyte on the substrate surface, the electrode 104 acts as an anode and the substrate surface and/or polishing medium 105 acts as a cathode. When removing material from a substrate surface, such as by dissolution from an applied bias, the electrode 104 functions as a cathode and the substrate surface and/or polishing medium 105 may act as an anode for the dissolution process.

The electrode 104 is generally positioned between the disc 106 and the bottom 110 of the basin 102 where it may be immersed in the electrolyte 120. The electrode 104 can be a plate-like member, a plate having multiple holes formed therethrough or a plurality of electrode pieces disposed in a permeable membrane or container. A permeable membrane (not shown) may be disposed between the disc 106 and the electrode 104 to prevent particles or sludge from being released from the electrode 104 into the electrolyte. The permeable membrane may also act as a filter and prevent gas evolution from the counter electrode from reaching the substrate during processing. Pores size and density of the permeable membrane are defined in a way to optimize the process performances.

For electrochemical removal processes, such as anodic dissolution, the electrode 104 may include a non-consumable electrode of a material other than the deposited material, such as platinum for copper dissolution. However, the electrode 104 can also be made of copper for copper polishing, if preferred.

In operation, electrolyte 120 is flowed from a reservoir 133 into the volume 132 via a nozzle 170. The electrolyte 120 is prevented from overflowing the volume 132 by a plurality of holes 134 disposed in a skirt 154. The holes 134 generally provide a path through the cover 108 for the electrolyte 120 exiting the volume 132 and flowing into the lower portion of the basin 102. At least a portion of the holes 134 are generally positioned between a lower surface 136 of the depression 158 and the center portion 152. As the holes 134 are typically higher than the lower surface 136 of the depression 158, the electrolyte 120 fills the volume 132 and is thus brought into contact with the substrate 113 and polishing medium 105. Thus, the substrate 113 maintains contact with the electrolyte 120 through the complete range of relative spacing between the cover 108 and the disc 106.

The electrolyte 120 collected in the basin 102 generally flows through the drain 114 disposed at the bottom 110 into the fluid delivery system 172. The fluid delivery system 172 typically includes the reservoir 133 and a pump 142. The electrolyte 120 flowing into the fluid delivery system 172 is collected in the reservoir 133. The pump 142 transfers the electrolyte 120 from the reservoir 133 through a supply line 144 to the nozzle 170 where the electrolyte 120 recycled through the ECMP station 102. A filter 140 is generally disposed between the reservoir 133 and the nozzle 170 to remove particles and agglomerated material that may be present in the electrolyte 120.

Electrolyte solutions may include commercially available electrolytes. For example, in copper containing material removal, the electrolyte may include sulfuric acid, sulfuric acid salt based electrolytes or phosphoric acid, phosphoric acid salt based electrolytes, such as potassium phosphate ($K_3PO_4$), ($NH_4$)$H_2PO_4$, ($NH_4$)$_2HPO_4$, or combinations thereof. The electrolyte may also contain derivatives of sulfuric acid based electrolytes, such as copper sulfate, and derivatives of phosphoric acid based electrolytes, such as copper phosphate. Electrolytes having perchloric acid-acetic acid solutions and derivatives thereof may also be used. Additionally, the invention contemplates using electrolyte compositions conventionally used in electroplating or electropolishing processes, including conventionally used electroplating or electropolishing additives, such as brighteners, chelating agents, and levelers among others. In one aspect of the electrolyte solution, the electrolyte may have a concentration between about 0.2 and about 1.2 Molar of the solution. Preferably, the electrolyte is selected to react with metal but not with the underlying materials, such as the dielectric.

During operation, a potential difference is applied between the electrodes 104 and 105. The substrate 113 being in direct contact with the electrode 105 will then be at the same potential as the electrode 105. The current loop is then completed in the polishing station by transforming atomic substrate materials into ions in the electrolyte. Concurrent mechanical polishing of the substrate 113 is achieved by relative movement between the substrate and the polishing medium 105. Further, the duration of a polishing cycle is monitored to determine an endpoint. An illustrative polishing station configured with a power supply and endpoint detection system will now be described with reference to FIG. 3.

Figure 3:
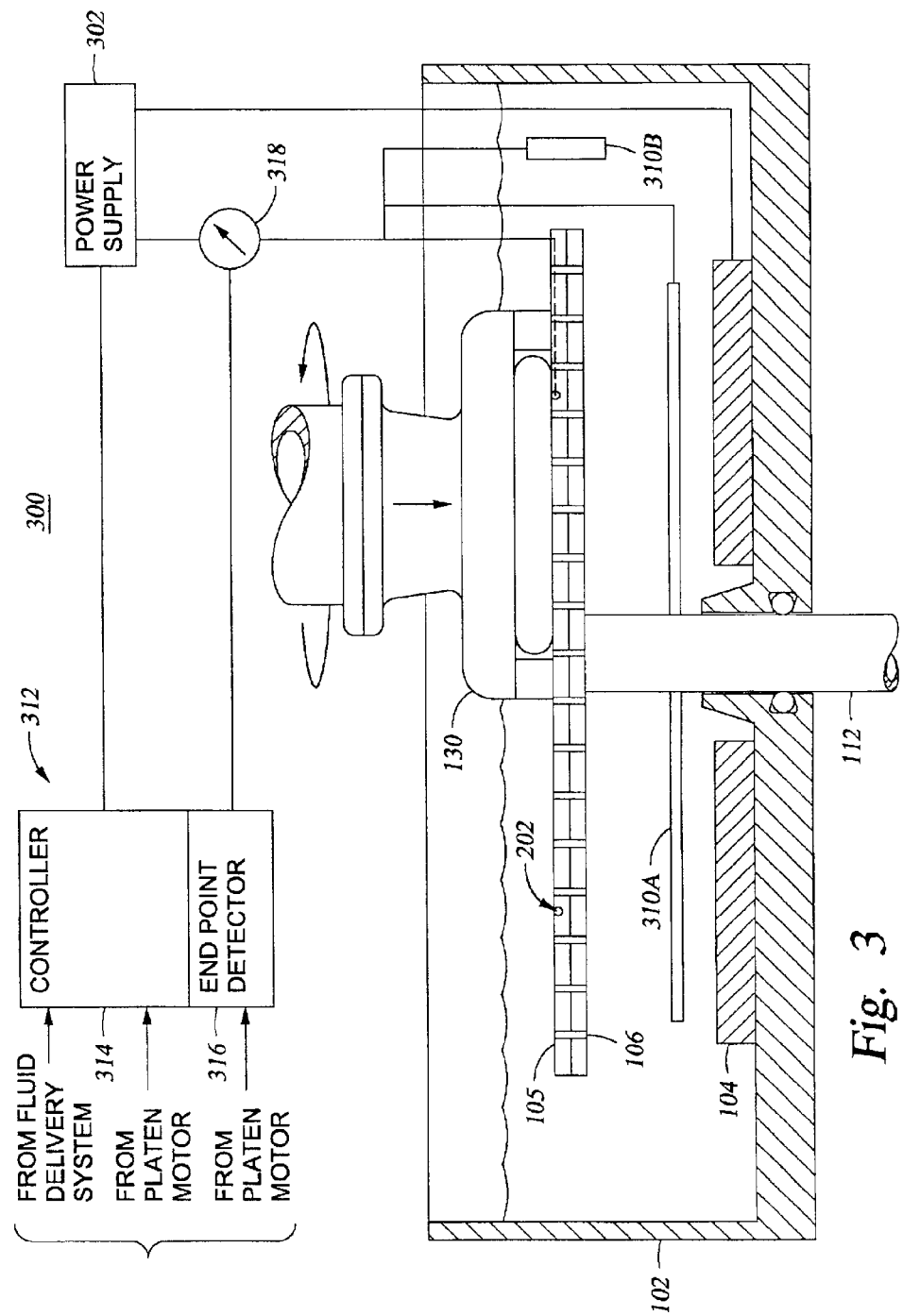
FIG. 3 is a side cross-sectional view of electropolishing system configured with a controller and endpoint detector.

FIG. 3 shows one embodiment of a polishing station 300, which may be representative of the polishing station 100 described above. Accordingly, like numerals have been used to designate like components described above with reference to FIG. 1 and FIG. 2. In general, such like components include the basin 102, the polishing head 130, the substrate 113, one electrode 104, the stem 112, the perforated pad support disc 106, the polishing medium 105 and the conducting element 202 (which forms the second electrode).

The polishing station 300 is energized by one or more power supplies, such as power supply 302. In one embodiment, the power supply 302 is a direct current (DC) power supply. However, the power supply 302 may also be an alternating current (AC) power supply. In one aspect, a DC power supply is preferred to avoid alternately removing and depositing material on a substrate. In general, the power supply 302 is capable of providing power between about 0 Watts and 100 Watts, a voltage between about 0V and 10V, and a current between about 0 amps and about 10 amps. However, the particular operating specifications of the power supply 302 may vary according to application.

The power supply 302 is particularly adapted to provide a voltage or current through the electrolyte 120. To this end, the power supply 302 is connected by a positive (+) terminal to a first electrode and by a negative (−) terminal to a second electrode. In one embodiment, the first electrode is a conducting portion of the polishing medium 105, such as the conducting element 202. As a result, the first electrode is in direct contact with a substrate disposed on the polishing medium 105, at least during part of a polishing cycle. The second electrode is the counter electrode 104 disposed on a floor of the basin 102, for example. In contrast to the first electrode, the second electrode may not be in direct physical contact with the substrate.

In one embodiment, the polishing station 300 Includes a reference electrode. For example, a reference electrode 310A may be disposed between the disc 106 and the counter electrode 104. More generally, a reference electrode may be at any location in the basin as long as the reference electrode is submerged within the electrolyte 120. For example, a reference electrode 310B is shown suspended between a sidewall of the basin 102 and the polishing medium 105. The reference electrode acts to maintain a constant electrochemical potential on the substrate. Accordingly, the provision of the reference electrode makes the removal rate independent from the changes in the conductivity in the current loop, which may be caused by the deposition of loose copper on the counter electrode 104 for instance. The reference electrode may be made of a very thin metal wire, such as a wire made of platinum, and is connected to the power supply 302.

The operation of the polishing system 300 is controlled by a control system 312. In one embodiment, the control system 312 includes a controller 314 and an endpoint detector 316. The controller 314 is operably connected to each of the devices of the polishing system 300, including the power supply 302, the fluid delivery system 172, the motor 124 and the carrier head 130. The endpoint detector 316 Is configured to monitor signal characteristics of the signal provided by the power supply 302. To this end, the endpoint detector 316 may be electrically connected to a meter 318 disposed in a power line of the power supply 302. Although shown separately from the power supply 302, the meter 318 may be an integral part of the power supply 302. In one embodiment, the meter 318 is an amp meter configured to measure current. In another embodiment, the meter 318 is a voltage meter configured to measure voltage. In still another embodiment, the meter is configured to measure voltage and current. A reading taken from the meter 318 may then be used by the endpoint detector 316 to determine whether a criterion has been satisfied. One criterion is whether the substrate has been sufficiently polished (i.e., whether a polishing endpoint has been reached). If a polishing endpoint has been reached, the endpoint detector 316 may notify the controller 314, which may then issue one or more control signals to initiate additional steps and/or halt the polishing of the substrate.

In at least one embodiment, "endpoint" refers to a point in time during a polishing cycle at which sufficient bulk metal has been removed from a substrate. Following detection of the endpoint, it may be necessary to continue polishing for a period of time in order to remove residual metal.

Figure 4A:
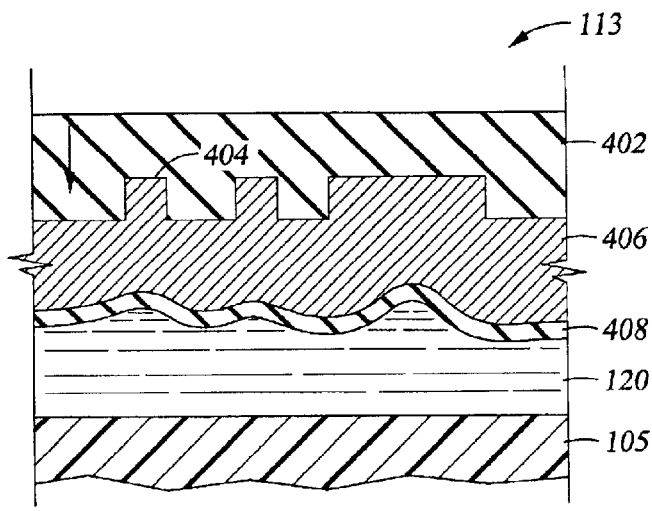
FIGS. 4A–C are a series of side cross-sectional views of a substrate and a polishing pad illustrating a polishing cycle.
Figure 4B:
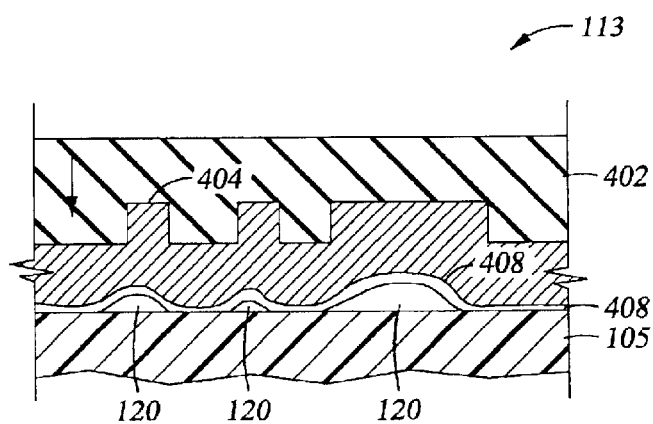
Figure 4C:
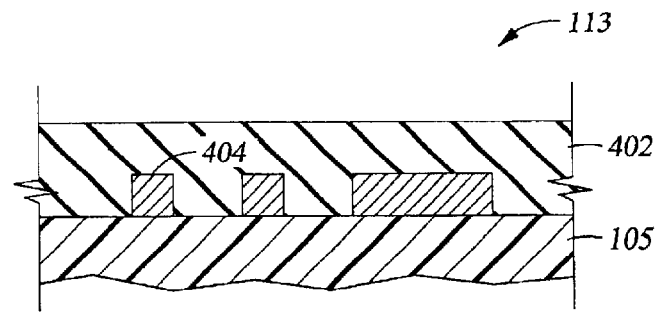

An endpoint detection operation will now be described with reference to FIGS. 4A–C. Referring to FIG. 4A, a side view of the substrate 113 and the polishing medium 105 is shown. The polishing medium 105 is shown submerged in the electrolyte 120 which is made an ionic conductor by application of a voltage or current from the power supply 302. The substrate 113 is shown located over the electrolyte 120 and moving downward toward the polishing medium 105. In general, the substrate 113 includes a base material 402 (typically made of silicon) having features formed therein. The base material 402 may be covered by multiple layers of dielectric materials, semiconducting materials and conducting materials. The outermost metal layer 406 has been previously deposited in the features 404 and over the previous dielectric, semiconducting and conductive layers. Illustratively, the metal layer 406 is copper. A passivation layer 408 is formed over the metal layer 406. The passivation layer 408 is selected to ensure that polishing occurs primarily where contact is made with the polishing medium 105. Passivation agents which are part of the conductive electrolyte will passivate the recess areas of the incoming metal layer to be polished. Illustrative passivation agents include BTA, TTA, etc. Accordingly, as shown in FIG. 4B, the passivation layer 408 is not present at the interface of the polishing medium 105 and the metal layer 406. The polishing which occurs in FIG. 4B is a combination of mechanical polishing (as a result of relative movement between the substrate 113 and the polishing medium 105) and anodic dissolution (as a result of chemical interaction between the substrate 113 and the electrolyte 120).

Polishing continues until the excess bulk metal has been removed, at which time the endpoint detector 316 indicates to the controller 314 that a polishing endpoint has been reached. FIG. 4C is illustrative of a surface condition of the substrate at a polishing endpoint. Copper lines (i.e., the copper in the features 404) are not being polished due to the fact that they are protected by the passivation agent and they are not in contact with the polishing medium 105. In one embodiment, polishing is allowed to continue for some period of time in order to ensure adequate removal of metal residues. This phase of polishing is referred to herein as "over polishing". Because the polishing endpoint has already been detected, over polishing can be carefully timed and controlled to minimize copper dishing and optimize wafer throughput.

Figure 5:
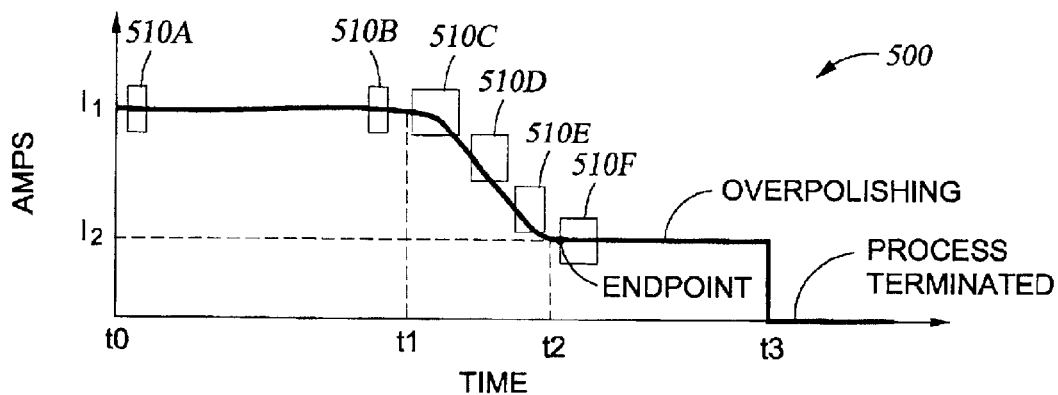
FIG. 5 is a graphical representation of a current curve illustrating changes of a current with respect to time where a voltage is maintained at a substantially constant value.

Referring to FIG. 5, a curve 500 is shown graphically illustrating the change in the electropolishing current (provided by the power supply 302) with respect to time. The current value is indicated on a vertical axis while time is indicated on the horizontal axis. Throughout the polishing cycle exemplified by curve 500, the power supply 382 maintains a substantially constant voltage. This manner of operation is referred to herein as "voltage mode" operation, since a constant voltage is applied to the polishing cell. It should be noted that the current curve directly generated from the meter 318 may not be as smooth as shown in FIG. 5, but the signal can be smoothed either by an electronic filter or software averaging.

During a first time period t0 to t1, polishing occurs with little or no change in the current. The state of the substrate during this time period is exemplified by FIG. 4B. During this time, a relatively high current is maintained due to the availability of metal ions supplied from the metal layer 406 (e.g., copper ions in the case of a copper layer). At time t1, the drop in the signal corresponds to the transition between a continuous film to a discontinuous film. The signal drop at t1 is detected by the endpoint detector 316. At time t1, the endpoint detector 316 can then signal the controller to either maintain the same voltage (as shown in FIG. 5) or switch the process to a lower voltage (as described below with respect to FIG. 6).

At a second period of time between t1 and t2 a reduction in the current is experienced, which may be detected by the endpoint detector 316. This time period is exemplified by a time period between the polishing states shown in FIG. 4B and FIG. 4C. The reduction in current is attributed to the reduction of metal ions dissolved into the electrolyte. The period of time between t1 and t2 typically corresponds to the transition between a very thin continuous metal layer and a discontinuous metal layer. The polishing of a discontinuous metal layer will result in less copper ions released in the electrolyte, resulting in a lower current.

At about t2, the current begins to stabilizes i.e., the slope of the curve 500 approximates zero. This is because the source of metal ions (i.e., the metal layer 406) has been substantially depleted. The polishing endpoint is reached at a particular degree of current stabilization. The state of the substrate at the polishing endpoint is exemplified by FIG. 4C and the endpoint is detected by the endpoint detector 316. At a third period of time between t2 and t3 the substrate may be subjected to additional polishing (i.e., over polishing) in order to remove residual metal. The duration of the time period t2 to t3 may vary according to a particular pattern design and density after which polishing is halted and the substrate is removed from the polishing medium. At the time t3, the power supply is then turned off and the substrate may then be transferred to another location of a polishing system for additional processing (e.g., rinsing or barrier layer polishing).

Figure 6:
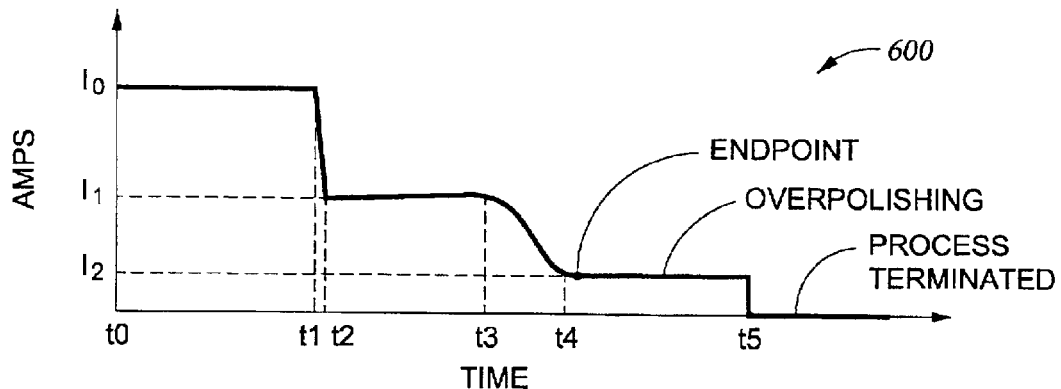
FIG. 6 is a graphical representation of a current curve illustrating changes of a current with respect to time where a voltage is maintained at a first substantially constant value for a first period of time and a second substantially constant value for a second period of time.

In the example described with reference to FIG. 5, the power supply 302 is configured to maintain a single voltage. However, in another embodiment, the applied voltage may be varied between two or more values. For example, the current curve 600 of FIG. 6 illustrates the effect on current when the voltage is changed from a first value to a second value. Specifically, a first voltage value is maintained for a period of time t0 to t2. During a portion of this time period (t0 to t1), the current is initially maintained a substantially constant value I0. At t1 to t2 a significantly decreasing current is observed. At t2 the voltage is switched to a second value.

In one aspect, the purpose of switching from a higher voltage value to a lower voltage value is to increase the wafer throughput. Specifically, the higher voltage value corresponds to a higher current and thus, a higher removal rate. However, while a higher removal rate is preferable with regard to throughput, the higher voltage value may not provide the best results in terms of copper dishing, copper residuals, surface finish, etc. Accordingly, once the remaining copper layer becomes very thin but still continuous, the voltage is then switched to the lower value. Illustratively, the switch is timed according to some predetermined time value selected to optimize throughput. In this manner, the process can be optimized for throughput as well as results (e.g., film quality).

After the voltage is switched to the second voltage value, the current is again maintained at a substantially constant value $I_1$. Illustratively, the substantially constant current value is maintained for a time t2 to t3. At time period t3, a second reduction in the current is observed. The reduction in current is monitored by the endpoint detector 316 until a polishing endpoint is detected at time t4. An over polishing step may then be maintained for a time period t4 to t5, after which the polishing cycle is complete and the substrate may be removed from the polishing station for subsequent processing.

Figure 7:
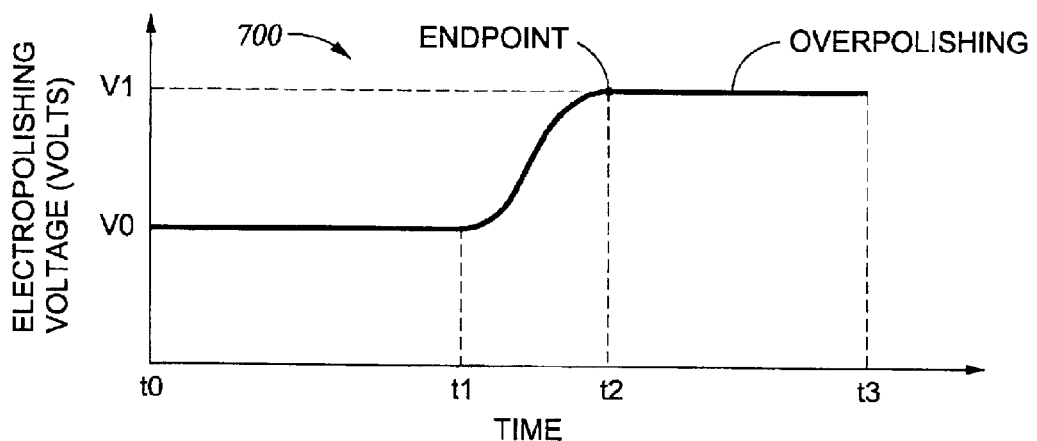
FIG. 7 is a graphical representation of a voltage curve illustrating changes of a voltage with respect to time where a current is maintained at a substantially constant value.

As described above, the curves 500 and 600 are indicative of a "current mode" operation in which changes in the current are monitored during a constant voltage. In another embodiment, referred to as "current mode" operation, changes in the voltage may be monitored while current is maintained at a substantially constant value. FIG. 7 shows a voltage curve 700 indicative of a signal characteristic monitored during current mode operation. The voltage curve 700 is defined according to voltage values, indicated on a vertical axis, which change with respect to time, indicated on a horizontal axis. Throughout the polishing cycle, the current is maintained at a substantially constant value. During an initial period of polishing (t0 to t1), the voltage remains at a substantially constant value, V0. At a time t1, an increase in the voltage is observed from V0 to V1. An endpoint is detected at t2 by the endpoint detector 316 where a degree of voltage stabilization is observed. An over polishing step may then be sustained for a time period t2 to t3, after which polishing is halted.

Accordingly, regardless of the mode of operation (i.e. current mode or voltage mode), a polishing endpoint is detected according to signal characteristics of a signal provided by the power supply 302. In each case, the same or similar algorithms may be used to detect the endpoint. In one embodiment, well-known algorithms may be used for detecting a predetermined rate of change of the signal characteristic. For example, it is contemplated that the etching endpoint detection algorithms used in etching systems may be adapted for use with the present invention. In such etching systems the wavelength of reflected light is typically monitored. Changes in the wavelength indicate when a material has been sufficiently etched. Accordingly, one embodiment of the present invention advantageously utilizes these and similar algorithms to advantage. More generally, however, persons skilled in the art will recognize other algorithms and techniques which may be used to advantage.

One particular endpoint algorithm will be described with reference to FIG. 5. The illustrative algorithm utilizes software definitions referred to as "windows" 510A–F. The purpose of these windows is to monitor an endpoint curve. As such, the size and number of windows is selected to generally describe the expected behavior of a curve. The size and the number of the windows may be defined by an operator of the ECMP polishing station and may vary between windows. Further, the windows are not anchored to a particular time interval on the graph of FIG. 5, but instead respond to the changes in the curve 500.

At the beginning of the process, (as soon as the power supply 302 is turned ON), the current is at a value $I_1$. The height of a first pair of windows 510A–B is set so that I1 must fall within a current predetermined range. If $I_1$ does not fall within the window height, the polishing station ohmic resistance is not within specification and is not behaving properly. In this event, the process is automatically stopped by the endpoint detector 316.

During proper operation, the current is stable between t0 and t1. That is, the endpoint curve 500 enters the windows 510A–B from the side and exits the windows 510A–B from the side. At time t1, the metal layer to be polished becomes discontinuous, and the current drops and the current curve 500 exits a window 510C from the bottom. The curve 500 exiting the bottom of the window 510C indicates a current drop to the endpoint detector 316. The signal exits the bottom of a number of windows 510D–E until all the remaining copper patches have been polished (i.e., until time t2). At time t2, there is no more copper to polish and the current is stable again $I_2$. Accordingly, the curve 500 exits from the side of the window 510F and the endpoint detector 316 detects the endpoint of the process at t2. The current $I_2$ corresponds to the situation in which no metal ions (or a negligible amount of metal ions) are being released in the electrolyte. As such, $I_2$ is typically very small (e.g., a few mAmps ) compared to $I_1$ (e.g., a few Amps). An overpolishing step can be done until time t3 to remove any residues.

In general, the endpoint detection algorithm may be implemented by hardware, software, or a combination of both. Accordingly, one embodiment of the invention is implemented as a program product for use with a computer system such as, for example, the systems 100 and 300 shown in FIGS. 1 and 3, respectively. The program(s) of the program product defines functions of the preferred embodiment and can be contained on a variety of signal-bearing media (or computer readable media), which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Persons skilled in the art will recognize that the foregoing embodiments are merely illustrative. The invention contemplates and admits of many other embodiments. For example, a number of the foregoing embodiments described a face down electropolishing technique. That is, the substrate to be processed is in a face down orientation relative to the polishing pad. However, in other embodiments, face up electropolishing techniques are employed. These and other embodiments are considered within the scope of the invention.

While the foregoing is directed to embodiments of the present invention, other and further embodiments of the invention may be devised without departing from the basic scope thereof, and the scope thereof is determined by the claims that follow.

What is claimed is:

1. A method for detecting a polishing endpoint, comprising:
    providing a cell body defining an electrolyte-containing volume, wherein the electrolyte-containing volume contains at least electrolyte;
    positioning a substrate in contact with a polishing pad at least partially submersed in the electrolyte;
    electropolishing one or more conductive materials on the substrate;
    delivering an electrical signal through an electrolyte; and
    detecting at least one of an increase in a voltage and a decrease in a current of the electrical signal to determine the polishing endpoint of the electropolishing.

2. The method of claim 1, further comprising causing relative motion between the substrate and the pad during the electropolishing.

3. The method of claim 1, wherein electropolishing comprises removing at least a portion of the one or more conductive materials by electrochemical activity.

4. The method of claim 1, wherein electropolishing comprises delivering an electrical signal through the electrolyte between a first electrode and a second electrode, wherein only the first electrode is positionable in direct physical contact with the substrate.

5. The method of claim 1, wherein detecting the polishing endpoint comprises monitoring a signal characteristic of the electrical signal.

6. The method of claim 5, wherein monitoring the signal characteristic of the electrical signal comprises monitoring at least one of a voltage and a current of the electrical signal.

7. A method for detecting a polishing endpoint, comprising:
    providing a cell body defining an electrolyte-containing volume, wherein the electrolyte-containing volume contains at least electrolyte;
    positioning a substrate in contact with a polishing pad at least partially submersed in the electrolyte;
    establishing a potential difference between a first electrode and a second electrode disposed in the electrolyte in order to produce a current through the electrolyte, wherein at least the first electrode is not disposed on a polishing surface of the polishing pad;

electropolishing one or more conductive materials on the substrate; and detecting at least one of an increase in a voltage and a decrease in a current of the electrical signal to determine the polishing endpoint of the electropolishing.

8. The method of claim 7, wherein the first electrode is disposed on a floor of the cell body below the polishing pad.

9. The method of claim 7, wherein the polishing pad is conductive.

10. The method of claim 7, further comprising continuing to polish the substrate for a period of time after detecting the polishing endpoint.

11. The method of claim 7, further comprising causing relative motion between the substrate and the pad during the electropolishing.

12. The method of claim 7, wherein electropolishing comprises removing at least a portion of the one or more conductive materials by electrochemical activity.

13. The method of claim 7, further comprising initiating a continuing polishing step upon detection of the polishing endpoint.

14. A computer readable medium containing a program which, when executed, performs an operation for detecting a polishing endpoint of an electropolishing process occurring for a substrate in contact with a polishing pad at least partially submersed in the electrolyte, the operation comprising:

detecting the polishing endpoint of the electropolishing according to at least one of a voltage and a current of an electrical signal delivered through at least the electrolyte.

15. The computer readable medium of claim 14, wherein the electropolishing comprises relative motion between the substrate and the pad.

16. The computer readable medium of claim 14, wherein the electropolishing comprises anodic dissolution induced by the electrical signal.

17. The computer readable medium of claim 14, wherein electropolishing comprises removing at least a portion of one or more conductive materials on the substrate by electrochemical activity.

18. The computer readable medium of claim 14, wherein the operation further comprises initiating a continuing polishing step upon detection of the polishing endpoint.

19. The computer readable medium of claim 14, wherein the operation further comprises changing a voltage value of the electrical signal after detection of a change in a slope of the electrical signal.

20. The computer readable medium of claim 14, wherein program comprises a process recipe comprising a plurality of voltage values for the electrical signal and wherein the operation further comprises selecting the voltage values according to polishing transition points.

21. The computer readable medium of claim 14, wherein the operation further comprises changing a voltage value of the electrical signal after detecting the polishing endpoint.

22. The computer readable medium of claim 14, wherein detecting the polishing endpoint comprises detecting at least one of an increase in the voltage and a decrease in the current of the electrical signal.

23. The computer readable medium of claim 22, wherein monitoring the signal characteristic of the electrical signal comprises monitoring at least one of a voltage and a current of the electrical signal.

24. An electro-chemical mechanical polishing system, comprising:

a cell body defining an electrolyte-containing volume;

a polishing pad disposed in the electrolyte-containing volume;

a power supply configured to supply an electrical signal to an electrolyte contained in the electrolyte-containing volume; and an endpoint detection system configured to monitor an increase in a voltage or a decrease in a current of the electrical signal to detect a polishing endpoint.

25. The system of claim 24, further comprising a reference electrode.

26. The system of claim 24, wherein the polishing pad is conductive.

27. The system of claim 24, further comprising a controller operably connected to the endpoint detection system and configured to halt a polishing cycle upon detection of the polishing endpoint by the endpoint detection system.

28. The system of claim 24, further comprising a controller operably connected to the endpoint detection system and configured to initiate a continuing polishing step upon detection of the polishing endpoint by the endpoint detection system.

29. The system of claim 24, further comprising a controller operably connected to the endpoint detection system and the power supply and configured to change a voltage value of the electrical signal upon detection of a change in a slope of the electrical signal by the endpoint detection system.

30. The system of claim 24, further comprising a controller operably connected to the endpoint detection system and the power supply and configured to execute a process recipe comprising a plurality of voltage values for the electrical signal, wherein the controller is configured to select the voltage values according to polishing transition points.

31. The system of claim 24, further comprising a controller operably connected to the endpoint detection system and the power supply and configured to change a voltage value of the electrical signal upon detection of the polishing endpoint by the endpoint detection system.

32. The system of claim 24, further comprising an electrolyte container to provide the electrolyte-containing volume with electrolyte.

33. The system of claim 24, further comprising:

a first electrode disposed in the electrolyte-containing volume and connected to a first terminal of the power supply; and a second electrode disposed in the electrolyte-containing volume and connected to a second terminal of the power supply.

34. The system of claim 33, wherein the first electrode is disposed on a wall of the cell body.

35. The system of claim 33, wherein the first electrode is disposed on the pad.

36. The system of claim 35, wherein the second electrode is not disposed on the pad.

37. The system of claim 24, wherein the pad comprises an electrically conductive medium located on a polishing surface of the pad and wherein a first terminal of the power supply is electrically connected to the electrically conductive medium.

38. The system of claim 37, wherein the polishing surface is non-conductive.

39. The system of claim 37, wherein a second terminal of the power supply is electrically connected to an electrode disposed in the electrolyte-containing volume.

* * * * *

UNITED STATES PATENT AND TRADEMARK OFFICE
CERTIFICATE OF CORRECTION

PATENT NO.       : 6,837,983 B2  
APPLICATION NO.  : 10/056316  
DATED            : January 4, 2005  
INVENTOR(S)      : Duboust et al.

It is certified that error appears in the above-identified patent and that said Letters Patent is hereby corrected as shown below:

On page 2, in item (56), under "U.S. Patent Documents", in column 1, line 5, delete "Mayer" and insert -- Mayer et al. --, therefor.

On page 2, in item (56), under "U.S. Patent Documents", in column 2, line 14, after "Nakamura" insert -- 438/691 --.

In column 1, line 34, deelte "electrochemical" and insert -- electro-chemical --, therefor.

In column 9, line 66, delete "Includes" and insert -- includes --, therefor.

In column 10, line 21, delete "Is" and insert -- is --, therefor.

In column 11, line 33, delete ""voltage mode "" and insert -- "voltage mode" --, therefor.

In column 14, line 31-33, in Claim 1, delete "providing a cell body defining an electrolyte-containing volume, wherein the electrolyte-containing volume contains at least electrolyte;".

In column 14, line 34-35, in Claim 1, after "polishing pad" delete "at least partially submersed in the electrolyte;".

In column 14, line 61-63, in Claim 7, delete "providing a cell body defining an electrolyte-containing volume, wherein the electrolyte-containing volume contains at least electrolyte;".

In column 14, line 64-65, in Claim 7, after "polishing pad" delete "at least partially submersed in the electrolyte;" and insert -- contacting the substrate diposed on the polishing pad with electrolyte; --, therefor.

In column 14-15, line 67-1, in Claim 7, after "second electrode" delete "disposed in the electrolyte in order".

UNITED STATES PATENT AND TRADEMARK OFFICE
CERTIFICATE OF CORRECTION

PATENT NO. : 6,837,983 B2
APPLICATION NO. : 10/056316
DATED : January 4, 2005
INVENTOR(S) : Duboust et al.

It is certified that error appears in the above-identified patent and that said Letters Patent is hereby corrected as shown below:

In column 15, line 11, in Claim 8, after "disposed" delete "on a floor of the cell body".

In column 15, line 28-29, in Claim 14, after "polishing pad" delete "at least partially submersed in the" and insert -- and an --, therefor.

In column 16, line 66, below "volume." insert -- 40. An electro-chemical mechanical polishing system, comprising: a processing pad having an upper surface adapted to process the substrate thereon; an electrode disposed below the processing pad; and an endpoint detection system configured to monitor at least one of an increase in voltage or a decrease in current of an electrical signal passing between the electrode and a substrate positioned one the upper surface of the processing pad to detect a processing endpoint.
41. The system of claim 40, further comprising a controller operably connected to the endpoint detection system and the power supply and configured to change a voltage value of the electrical signal upon detection of a change in a slope of the electrical singal by the endpoint detection system.
42. The system of claim 40, further comprising a controller operably connected to the endpoint detection system and the power supply and configured to execute a process recipe comprising a plurality of voltage values for the electrical singal, wherein the controller is configured to select the voltage values according to polishing transition points.
43. The system of claim 40, wherein the pad comprises an electrically conductive medium located on a polishing surface of the pad and wherein a first terminal of the power supply is electrically connected to an electrically conductive medium. --.

Signed and Sealed this

Eighth Day of August, 2006

JON W. DUDAS
*Director of the United States Patent and Trademark Office*